(12) United States Patent  (10) Patent No.: US 8,768,963 B2
Kothari et al.  (45) Date of Patent: Jul. 1, 2014

(54) METHODS AND SYSTEMS FOR DETECTING SKEWED DATA IN A MULTITENANT DATABASE ENVIRONMENT

(75) Inventors: Pallav Kothari, San Francisco, CA (US); Scott Hansma, San Francisco, CA (US); Scott Yancey, San Francisco, CA (US); Kevin Oliver, San Francisco, CA (US); Jiahan Jiang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 23 days.

(21) Appl. No.: 12/976,100

(22) Filed: Dec. 22, 2010

(65) Prior Publication Data

US 2011/0295814 A1 Dec. 1, 2011

Related U.S. Application Data

(60) Provisional application No. 61/350,169, filed on Jun. 1, 2010.

(51) Int. Cl.
*G06F 17/30* (2006.01)

(52) U.S. Cl.
USPC .............................. 707/783; 707/713; 707/716

(58) Field of Classification Search
CPC ................... G06F 17/30306; G06F 17/30536; G06F 17/30592
USPC .......................... 707/687, 812, 714, 783, 716
See application file for complete search history.

(56) References Cited

U.S. PATENT DOCUMENTS

2005/0065925 A1* 3/2005 Weissman et al. ................. 707/4
2008/0172421 A1* 7/2008 Birnbaum et al. ............ 707/202

* cited by examiner

*Primary Examiner* — Ann Chempakaseril
(74) *Attorney, Agent, or Firm* — Haynes Beffel & Wolfeld LLP; Ernest J. Beffel, Jr.

(57) ABSTRACT

Detection of skew in an on-demand database services environment is provided. A request is generated to scan a multitenant database for skew indicated by relationship depth exceeding an expected limit. A database crawler calculates skew for tenant identifier for a particular table in the database. Any skew that is detected is identified for later resolution.

20 Claims, 7 Drawing Sheets

METHODS AND SYSTEMS FOR DETECTING SKEWED DATA IN A MULTITENANT DATABASE ENVIRONMENT

RELATED CASES

This application claims the benefit of priority of U.S. Provisional Patent Application No. 61/350,169, filed Jun. 1, 2010.

FIELD

Embodiments of the invention are related generally to database management, and embodiments of the invention are more particularly related to detecting skewed data in a database network system.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright® 2010, Salesforce.com Inc., All Rights Reserved.

BACKGROUND

In conventional database systems, users access their data resources in one logical database. A user of such a conventional system typically retrieves data from and stores data on the database using the users own systems. The user system may remotely access one of a plurality of server systems that in turn accesses the database system. Data retrieval from the system generally occurs via the user generating a query from the user system to the database system. Traditional database systems process the query for data requests and send information relevant to the request back to the user system. In implementations with one logical database, issues related to storage and access of user data, as well as allocation of database system resources are handled specific to the user preferences. According to user preferences, there may be assumptions about access or resource use related to the user's access to the database system.

If the assumptions do not match the actual implementation of the database system for data access by the user, performance degradation can easily occur. It is possible for associations of data in the database to consume more system resources than anticipated for the database, which can degrade database access performance.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

White the assumptions about access and resource allocation may be controlled for a single logical database system for a user, the assumptions about access, database setup, and resource allocation can easily be different than reality for a user of a multitenant database system (MTS). An MTS provides storage for multiple tenants in the same logical database system. If a user assumes all database resources are available to the user, the system performance may degrade both for the particular user, and for other tenants of the database as MTS resources are strained due to use by a particular tenant.

An MTS may be configured to have certain storage architecture standards in the database, to allow it to service multiple tenants from the same database. It is possible for a particular tenant to establish data relationships among its stored data elements that puts a strain on MTS resources. As used herein, "data skew" indicates a relationship depth for data elements of a multitenant database greater than a threshold. In one embodiment, data skew is calculated for each tenant and separate database tables. More specifically, related lists, sharing/owner changes, and performance in other parts of the multitenant database environment may suffer when the MTS has to deal with skew in data element relationships (e.g., dealing with parent, child relationship data).

As described herein, soft limits may be introduced on data relationships in the MTS. With the establishing of soft limits or thresholds on relationship depth, detection of skew in an on-demand database services environment is provided. A request is generated to scan a multitenant database for skew indicated by relationship depth exceeding an expected limit. A database crawler calculates skew for a tenant identifier in the database. In one embodiment, skew is calculated for a particular tenant identifier for a particular table in the database. Any skew detected is identified for later handling and/or resolution.

Identified skew can be handled, for example, by providing surface warning messages on the user interface to a tenant, or by emailing organization administrators to bring the skew to the attention of the administrator at the user end. Additionally, other operations on the skewed relationships can be blocked, or data access may be otherwise restricted for a particular tenant based on detected data skew for the tenant.

Figure 1:
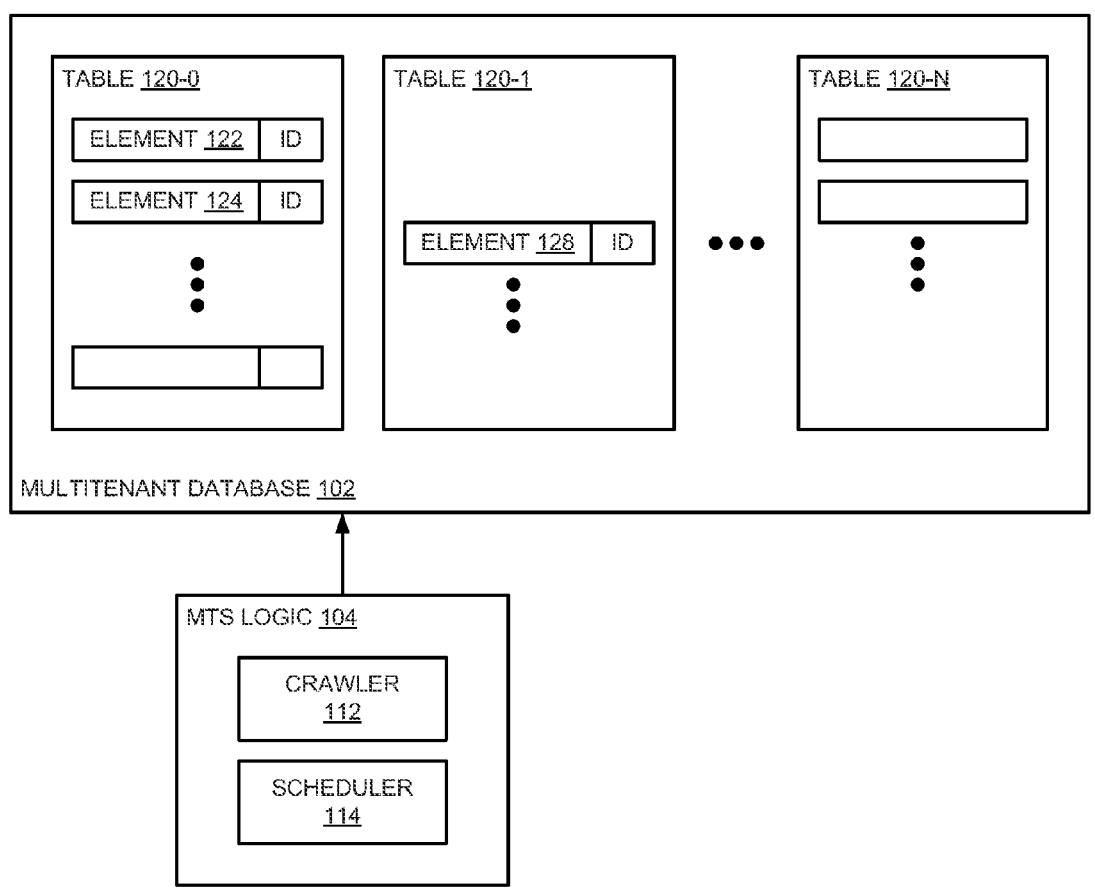
FIG. 1 is a block diagram of an embodiment of a system having a database crawler to detect data skew in an on-demand database services environment.

FIG. 1 is a block diagram of an embodiment of a system having a database crawler to detect data skew in an on-demand database services environment. System 100 illustrates elements of an MTS, and could be referred to as "MTS 100", but will be referred to as "system 100". Multitenant database 102 includes data stored in multiple tables, 120-0 through 120-N, where N is some integer number of tables. The number of tables may be chosen for any configuration consideration of the MTS. For example, system 100 may have a certain number of object types, each stored in different tables (whether tables could be distinguished physical and/or logically). Other uses of tables could be for purposes of managing the amount of data stored in any given table.

As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization.

Each table 120-0 through 120-N includes any number of data elements. In an implementation where tables correspond to object types, elements 122 and 124 of table 120-0 can be considered object instances of the type of table 120-0. Data elements of one table may be related to data elements of other tables. For example, element 128 of table 120-1 could be related to elements 122 and 124 (for example, element 128 may related to elements 122 and 124 with parent-child relationships).

As suggested above, system 100 may have standard logic in its system applications that assumes a certain relationship depth maximum. The "assumption" can exist in the way the logic is implemented within the MTS, and a relationship depth above the maximum causes performance degradation because of the design of the logic. Rather than having to redevelop the logic for the entire system, soft limits (thresholds) can be placed on relationship depths that prevent the performance degradation. Each system configuration may be different, and thus the thresholds that avoid or reduce performance degradation will be different for each implementation. Those of skill in the art will understand where such limits are for their individual implementations.

MTS logic 104 represents logic in system 100. While certain logic (not shown) within MTS logic 104 may suffer performance degradation due to excessive relationship depth or data skew, other logic may be provided to detect data skew. MTS logic 104 includes crawler 112 to crawl through multitenant database 102 to detect data skew. In one embodiment, each table is inspected to determine whether relationship depth of objects in the table is greater than a threshold value (e.g., a configurable value stored for crawler 112). Determination of depth greater than a threshold is performed for a given tenant ID (e.g., the ID associated with each data element of tables 120-0 through 120-N). In one embodiment, skew is defined not only for a given tenant ID, but also for a given table. Thus, skew may be identified for a particular tenant with respect to a particular table (e.g., table 120-1), identifying skew per tenant ID per table.

In one embodiment, MTS logic 104 includes scheduler 114, which provides scheduling for the crawl operations of crawler 112. Additional details related to embodiments of a crawler and embodiments of a scheduler are provided below with respect to FIG. 3. Generally, scheduler 114 may indicate when crawler 112 should execute. The execution may be in response to a request, an event, or a timer. Scheduler 114 may invoke crawler 112 with limitations on resource usage by crawler 112, thus controlling the loading effect on the MTS. For example, scheduler 114 may invoke crawler 112 only on non-peak hours, or restrict the amount of processing resources or memory that can be used by the crawler.

While specific reference is made above to system 100, in general, embodiments of the invention relate to detecting data skew, where data skew indicates a relationship depth for data elements of the multitenant database greater than a threshold for a particular client organization. A skew agent may execute to determine skew, which may include a crawler to mine the database for skew information. The skew agent receives a request to detect data skew in a multitenant database, and initiates a database crawl operation to detect data skew for data stored in the multitenant database.

Detecting data skew involves determining whether a relationship depth of objects within the multitenant database is higher than a threshold. Thus, the skew agent calculates the relationship depth of objects within the multitenant database, including identifying relationships by tenant ID. The skew agent identifies data skew for any case where relationship depth exceeds the threshold for data associated with a particular tenant ID. In one embodiment, data skew is determined based on tenant ID and database table. There may be different thresholds for different tables.

With regard to operations related to determining skew, or mining the database for skew information, the skew agent determines what relationships to monitor for skew. In one embodiment, all data relationships are monitored for skew. In alternative embodiments, only certain relationships are monitored for skew, or skew may be detected for certain relationships in one crawl, and a different relationship in a different craw. The relationships to monitor for data skew prevent may be identifiable at the UDD (universal data dictionary) level by an attribute on the (foreign key) fields of an entity. The UDD includes definitions of objects, including their fields, for the system.

In one embodiment, calculating the relationship depth of objects includes identifying a data model associated with the object, and calculating relationship depth based on the data model. For example, the data model may indicate relationships that are monitored, or may define how relationships are stored, and thus how the crawler can mine for the skew information. In one embodiment, a multitenant database may include standard data models for use by all tenants, and custom data models for user-defined objects and/or tables. Thus, the skew agent may need to determine from a user definition how the relationships are to be calculated. Calculating relationship depth on such custom objects may include accessing a metadata table or other information that identifies the custom data model of the object. Then relationship depth can be calculated based on the specific data model defined.

In one embodiment, the skew agent can initiate skew detection based on receiving a request from an MTS administrator. In one embodiment, the skew agent can initiate skew detection based on receiving a request from a user administrator. For example, a setup page can exist for user-side administrators to allow them to see skewed relationships, and they may be able to request a recalculation (e.g., via selecting a button or other GUI element). In one embodiment, a runtime page can exist for all organizations or per organization that shows skew data and lets an administrator request a re-count per relationship or per organization.

In one embodiment, the skew agent can initiate skew detection based on timing, such as at a particular time of day (e.g., performing a scan task once a day), or at the expiration of a timer. In one embodiment, the skew agent can initiate skew detection based on a state of the MTS of which the database is a part. For example, the state of the MTS could be evaluated for load, and crawling could be initiated when load is under a certain level, and paused whenever the load is above a level. Thus, crawling could be performed as a background process without causing excessive load on the MTS.

In one embodiment, the skew agent identifies candidates for skew analysis by logging slow running queries. The identification of candidates may be used to determine what to analyze the next time a crawl is triggered. Additionally, identification could trigger an analysis to occur (e.g., trigger the initiation of a crawl).

In one embodiment, object relationships are registered at startup time of an application server, making them available to a scheduled task responsible for data mining to detect skew. The skew agent can be configured to automatically disregard entities that do not have a "deleted" column or valid indexes containing the deleted column.

With regards to data related to determining skew, the crawler can store information in a cache (e.g., a memcache), and then dump or store relationships identified as skewed in a database table (e.g., in system data). Results data and running data during a crawl can be stored, for example, in memory associated with one or more application servers and refreshed some variable number of minutes (e.g., a simple map reloaded every 5 minutes). If such a map becomes too large, the tenant ID associated with identified skew can be stored as a key in memory, with relationship details in memcache.

For large multitenant databases, it is expected that the run time for mining skew information will be relatively slow (e.g., 6-8 hours). Thus, the skew agent scheduler may attempt to schedule the mining for a particular block of time (e.g., at night) most likely to allow the operations to be performed without overloading the system. Especially because of the fact that mining is expected to be relatively slow, an indication of skew may become outdated, for example, continuing to display warnings for a relationship even though the organization's administrator has been working all day trying to alleviate the data skew. Thus, in one embodiment, a validation process can be executed to improve end user experience.

The validation process may be a satellite process that reexamines skewed data (data or relationships flagged or marked as skewed). Thus, the likelihood of false positives (the system flagging data as skewed when the data is now within bounds) can be reduced by a process referred to below as an inspector. The inspector can execute more frequently (e.g., every 30 minutes) and only verify whether previously detected skew has been resolved.

In one embodiment, the skew agent maintains a history of warnings at the application level. When warning state changes from skewed to non-skewed, the skew agent can hide the notice and/or give an all-clear message. In the event of a warning state changing to skewed, the message can be used for rate limiting and/or for displaying a notice. In addition to skew notices, the skew agent could provide statistics related to any one or more components of the crawl for a tenant.

Regarding enforcement of skew warnings, skew can be handled in many ways. In one embodiment, the system simply provides default hooks that display warnings on entities with data skew problems. Beyond a certain threshold, the skew agent can send an email to the parent-object-owner and/or the administrators and/or provide other notification. In one embodiment, there are multiple thresholds, and beyond a final threshold, the system may prevent further operations from being performed on an identified skewed relationship. Thus, object merger or change of ownership may be prevented.

In one embodiment, there may be tiered thresholds (tn), which may be specified as Org Values. The defaults might, for example, be something like: $t1=10^4$, where a surface warning is generated on the UI; $t2=10^5$, where an email is sent to an administrator of the tenant organization; and, $t3=10^6$, where the system blocks further inserts, certain edits, merges (e.g., merging two problematic accounts should not be allowed), ownership changes, or lookups. In one embodiment, thresholds could be specific to an entity, allowing different thresholds for different entities.

In one embodiment, a user-side administrator is able to request a recalculation of skew. In such a scenario, it may be assumed that the user administrator would like a recount to be known sooner rather than later. In such a case, rate limiting may be applied to the tenant to free resource bandwidth to perform a recount (e.g., reduce available resources to the tenant by an amount of resources used to perform the recount). Such a case of recount may be more specific than a crawl that looks at all data in the multitenant database; rather, the recount can be restricted to the tenant ID of the requesting tenant.

Figure 2:
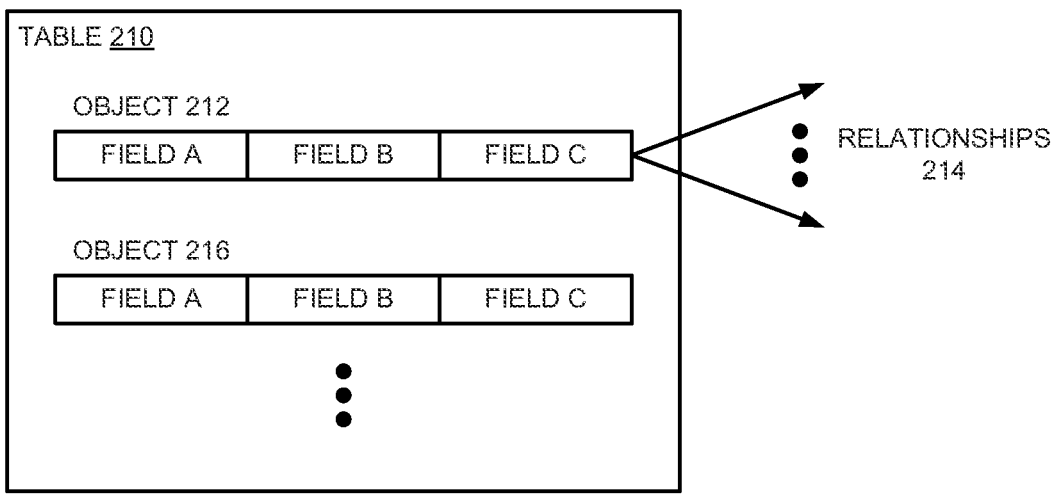
FIG. 2 is a block diagram of an embodiment of a multitenant database table architecture with data relationships that are checked for skew.
Figure 2:
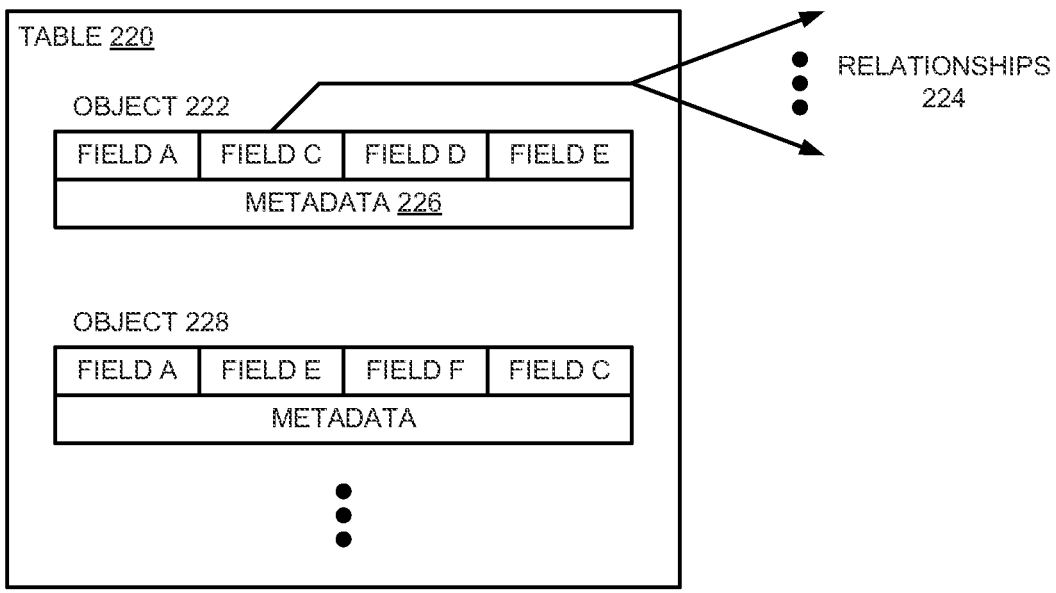

FIG. 2 is a block diagram of an embodiment of a multi-tenant database table architecture with data relationships that are checked for skew. System 200 represents components of a multitenant database that is checked for data skew. More specifically, tables 210 and 220 are part of a multitenant database that is configured with multiple tables of data objects. Table 210 includes objects 212 and 216, while table 220 includes objects 222 and 228.

In one embodiment, table 210 represents a table that includes a standard Objects, defined by a standard data model available system-wide in a UDD. Table 220 represents a table that includes custom objects defined by metadata associated with the objects (e.g., metadata 226 associated with object 222). The metadata could be stored with the objects in table 220, or could be stored in a separate table (not illustrated).

The objects are intended to be represented generically. Objects 212 and 216 are illustrated as having Fields A, B, and C. Field C is illustrated as the object field that is to be checked for relationship 214 to other objects. Data skew is detected based on the relationships for a particular tenant ID. Thus, relationships may also be computed for object 216, but assuming that object 216 has a different tenant than object 212, its relationship depth or count will be counted towards a threshold for the other tenant ID.

Object 222 is illustrated as having Fields A, C, D, and E. Assuming for the sake of example that Field C is the field from which relationship depth is determined, relationships 224 can be computed towards a relationship depth threshold for a tenant ID associated with table 220. Even assuming the tenant ID is the same for Objects 212 and 222, relationships 214 and 224 may count towards different thresholds, because in certain implementations relationship depth is counted per tenant ID per table, and objects 212 and 222 are in different tables.

Object 228 is illustrated as having Fields A, E, F, and C. The point of illustrating object 228 is to indicate that while objects 212 and 216 have the same fields, or are based on the same data model, objects 222 and 228 are not necessarily based on the same data model. Rather, metadata associated with the object is accessed in determining data skew for the data model associated with the particular object.

Figure 3:
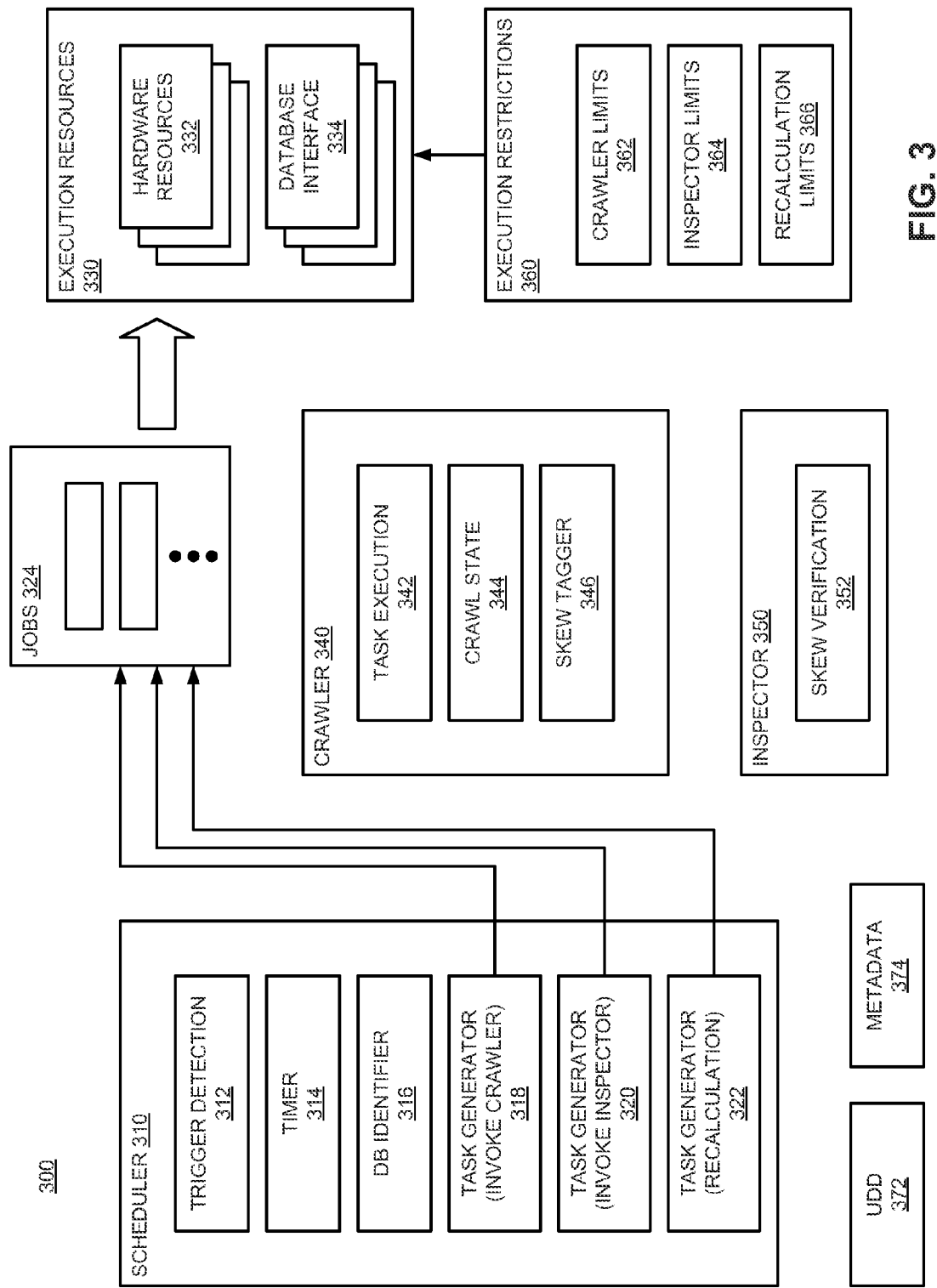
FIG. 3 is a block diagram of an embodiment of a system having a scheduler, a crawler, and an inspector to detect skew in a multitenant database environment.

FIG. 3 is a block diagram of an embodiment of a system having a scheduler, a crawler, and an inspector to detect skew in a multitenant database environment. System 300 illustrates components of a skew agent or skew manager that determines skew. Not all components are required for every implementation. Thus, a skew agent could be implemented that is more or less complex than what is illustrated in skew agent 300. The various components are illustrated with various functional components.

Skew agent 300 includes scheduler 310, which manages when skew is determined. Trigger detection 312 represents mechanisms that allow the skew agent to determine when to perform a crawl, or when to perform a recalculation or other skew detection process. Trigger detection 312 may include mechanisms to receive a request by a user administrator, or to receive a request by an MTS administrator. In one embodiment, scheduler 310 includes timer 314 or similar timing control mechanism. Thus, trigger detection 312 can be operated based on timer 314 to perform a skew detection process based on timing (e.g., a time of day, or after a certain amount of time).

In one embodiment, scheduler 310 can schedule skew detection for multiple database instances. Thus, database (db) identifier 316 enables scheduler 310 to indicate what database instance to mine for skew information. In one embodiment, rather than identifying a particular database, database identifier 316 represents a progress indicator or "bookmark". When mining for data, the mining operations may be interrupted (e.g., if they take too long, or if system circumstances change causing the function to be paused). Database identifier 316 as a progress indicator logs where data mining was interrupted to enable scheduler 310 to generate tasks to pick back up where it last left off.

Task generators 318, 320, and 322 each represent mechanisms to enable scheduler 310 to generate jobs 324 to perform the data skew detection operations. Detecting skew may be a very substantial process to perform. Rather than sending a massive process to an application server for execution, multiple smaller data skew tasks can be created as individual jobs 324. All jobs can be sent to the same application server, or could be sent to multiple different application servers for execution. Jobs 324 represent operations for execution within system 300. In one embodiment, jobs 324 may include any jobs or tasks to perform within system 300, and not just tasks related to detecting skew. Task generators 318, 320, and 322 specifically provide operations related to data skew detection.

Task generator 318 generates tasks that are related to a database crawl. Thus, in one embodiment, task generator 318 invokes crawler 340 as an application to execute on one or more application servers to crawl the database. The tasks for crawler 340 to execute are part of jobs 324, which are sent to execution resources 330. A database crawl can be understood as a series of operations that analyze multiple (or possibly all) elements of the database or a subset of the database.

Crawler 340 includes task execution 342 to perform the tasks related to crawling or mining the database for skew information. Crawl state 344 represents a state of crawl operations of crawler 340, or persisted state information. Thus, crawler 340 can be interrupted in performing its crawl operations, and then return to where it was interrupted. Thus, the crawl does not need to be performed in one continuous operation. Rather, the crawl could be performed, for example, over multiple days in the case of a large database, and a crawl that only takes place for a period of time once per day. Skew tagger 346 enables crawler 340 to tag or indicate data where skew is detected.

In one embodiment, crawler 340 includes information related to data models and how to count relationship depth for objects in the database. Alternatively, crawler 340 may access the information from system data or from the database itself. As illustrated, UDD (universal data dictionary) 372 represents system data available from a system database associated with system 300. UDD 372 can include information related to the data model of objects to be checked for relationship depth. Metadata 374 may represent metadata information stored in system data that describes the format or data model of an object, and allows system 300 to determine relationship depth. Alternatively, metadata 374 may represent metadata stored in the database itself. Thus, crawler 340 could access metadata 374 to identify how the objects are structured, and how to recognize relationship depth of the object, and then would determine the relationship depth accordingly by accessing the object from the database.

Task generator 320 generates tasks that are related to verification of relationships marked as skewed by crawler 340. In one embodiment, task generator 320 invokes inspector 350 (which could also be referred to as a skew verification agent) as an application to execute on one or more application servers to determine whether skew has been resolved on data or relationships marked as skewed. The tasks for inspector 350 to execute are part of jobs 324, which are sent to execution resources 330. Skew verification 352 enables inspector 350 to check on relationship depth specifically for data previously marked as skewed. It will be understood that skew verification 352 does not need to mine the database for skew information, but need only verify the relationship depth for flagged data. Thus, the scope of skew verification 352 is smaller than that of crawler 340. Thus, inspector 350 can run more frequently than crawler 340 (e.g., hourly or every half-hour in contrast to once daily).

Task generator 322 generates tasks that are related to a manually requested recalculation of relationship depth. In one embodiment, task generator 322 invokes inspector 350, but could also invoke inspector 350 or another logic program or routine of a program to perform a relationship depth calculation. A recalculation is an operation performed in response to a specific request by a user administrator or a system administrator. The user administrator manages the access to the multitenant database from the user side. A system administrator manages the multitenant database. In one embodiment, a recalculation can be requested by a user administrator through an MTS interface, for example to allow a user administrator to attempt to clean up a problem relationship depth and verify that it is corrected.

Execution resources 330 include hardware resources 332 and one or more database interfaces 334. Hardware resources 332 include any processing devices, memory devices, storage devices, and other hardware that may be used to perform jobs 324. Hardware resources 332 include the hardware that executes the application servers and crawler 340 or inspector 350. Database interface 334 represents hardware interconnections, ports, and interface circuits (e.g., a network interface circuit (NIC)), as well as the software and network stacks used to interconnect to a multitenant database.

As suggested previously, there may be limits placed on resource use for the crawler operations, inspector operations, and recalculation operations. Execution restrictions 360 represent the limits that may be placed on the use of execution resources 330 by various jobs 324. Crawler limits 362 indicate restrictions on the operation of crawler 340, and inspector limits 364 indicate restrictions on the operation of inspector 350. Recalculation limits 366 indicate limits on the operations associated with a recalculation. The restrictions placed on a recalculation may be distinct from the limits placed on a program that will perform the recalculation operations, e.g., inspector 350.

Examples of the types of limits that may exist in execution restrictions 360 may include how many processing resources a program is allowed to have, how many threads or how many processes are allowed to be executed at the same time, how many or which application servers can process the requests, how many database connections can be opened and/or what bandwidth is available through the connections, how much memory can be consumed, or other restrictions.

Figure 4:
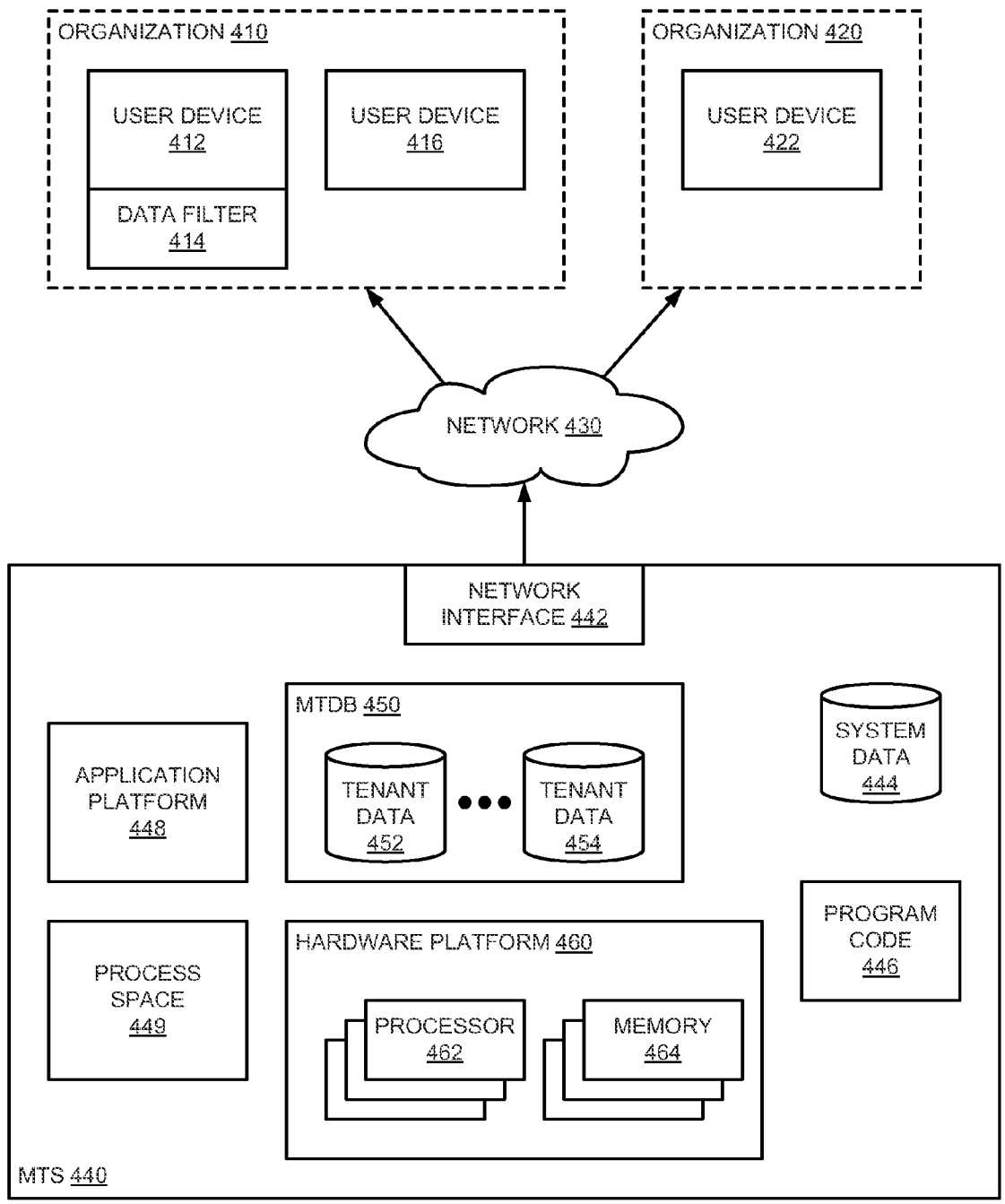
FIG. 4 is a block diagram of an embodiment of an environment for on-demand database services.

FIG. 4 is a block diagram of an embodiment of an environment for on-demand database services. Environment 400 includes components related to an on-demand database service. Environment 400 includes multitenant database system (MTS) 440 and one or more organizations 410 and 420, which are tenants of the MTS. Each organization can include one or more users and/or user devices.

MTS 440 provides on-demand database services for environment 400. An on-demand database service, such provided by MTS 440, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 440 stores information from one or more tenants into tables of a common database image or multitenant database (MTDB) 450. Accordingly, MTS 440 provides on-demand database service. A database image may include one or more database objects. A multitenant database stores data for various different tenants or organizations in a single database instance. Resources (such as memory, processing space, processing hardware, and other resources of the database system are shared or allocated among the different tenants.

Multitenant database 450 includes tenant data 452, . . . , 454. The tenant data may be divided into different storage areas, which can be a physical and/or a logical arrangement of data. In one embodiment, multitenant database 450 is accessed via a relational database management system (RDBMS) or the equivalent, which executes storage and retrieval of information against the database object(s). In one embodiment, multitenant database 450 is accessed via an object-oriented database management system (OODBMS) or the equivalent. In one embodiment, multitenant database 450 is accessed via an object-relational database management system (ORDBMS) or the equivalent. It will be understood that an RDEMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 448 represents a framework that allows applications of MTS 440 to execute. Thus, application platform 448 includes the software components (such as an operating system) to allow execution of the applications. Hardware platform 460 provides hardware resources to enable the applications to execute on application platform 448, as well as enabling execution of management or control logic for MTS 440. In one embodiment, application platform 448 of MTS 440 enables creation, managing, and executing one or more applications developed by the provider of the on-demand database service, users accessing the on-demand database service via network 430, or third party application developers accessing the on-demand database service via network 430.

MTS 440 represents any type of system that may provide on-demand database service. In addition to application platform 448 and hardware platform 460, which includes processor resources 462 and memory resources 464, MTS 440 may include other components. MTS 440 includes network interface 442 to enable user devices to access MTS 440 over network 430. In one embodiment, MTS 440 includes system data 444, program code 446, and process space 449. System data 444 represents data specific to the running of MTS 440, rather than being tenant data. It is logically separated from the tenant storage, and may be physically separated (e.g., by designating storage areas or address ranges for system data). Program code 446 represents code to implement various functions of MTS 440, which enable the system to provide on-demand database service. Process space 449 represents a framework for executing MTS processes and tenant-specific processes, such as running applications as part of an application hosting service. Additional processes that may execute on MTS 440 include database indexing processes. It will be understood that MTS 440 may include more or fewer components than what is illustrated.

As mentioned above, environment 400 includes organizations 410 and 420, which represent tenants of MTS 440. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 440. Each tenant ID could have certain associated properties for use, depending on how the organization is configured. User device 422 is associated with organization 420, and access MTS 440 under the tenant ID of organization 420. Similarly, user devices 412 and 416 are associated with organization 410, and access MTS 440 under the tenants ID assigned to organization 410.

User devices 412, 416, and 422 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 440 via network 430.

Within an organization, users may be further given access privileges and/or restrictions, as illustrated by data filter 414. As illustrated, user device 416 may access MTS 440 in accordance with whatever access is available to organization 410, while user device 412 has additional restrictions applied by data filter 414. In one embodiment, data filter 414 may additionally or alternatively provide specific user interface features for user 412 in accessing data from MTS 440.

The users of user devices 412, 416, and 422 may differ in their respective capacities, and the capacity of a particular user device might be entirely determined by permissions (permission levels) for the current user. For example, where a salesperson is using a particular user device to interact with MTS 440, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 414, which can filter per device and/or could filter for the entire organization (e.g., a central filter as opposed to distributed filtering).

Network 430 represents any network or combination of networks. A network is generically an interconnection of devices that communicate with each other. Network 430 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 412, 416, 422 (and other user devices not shown) communicate with MTS 440 over network 430 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 412 might include an HTTP client commonly referred to as a "browser" for sending and receiving HTTP messages to and from an HTTP server at MTS 440 (not specifically shown, but which could be executed on hardware platform 460). Such an HTTP server might be implemented as the sole network interface between MTS 440 and network 430, but other techniques might be used as well or instead. In one embodiment, the interface between MTS 440 and network 430 includes load sharing functionality, such as round-robin HTTP request distributors to balance loads and distribute incoming HTTP requests evenly over a plurality of servers. At least as for the users that are accessing that server, each of the plurality of servers has access to data in MTS 440; however, other alternative configurations may be used instead.

In one embodiment, MTS 440 implements a web-based customer relationship management (CRM) system. For example, in one embodiment, MTS 440 includes application servers configured to implement and execute CRM software applications as well as provide related data, code, forms, webpages and other information to and from user devices (e.g., 412, 416, 422) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 440 implements applications other than or in addition to a CRM application. For example, MTS 440 may provide tenant access to multiple hosted (standard and custom) applications, including CRM application. User (or third party developer) applications, which may or may not include CRM, may be supported by application platform 448, which manages creation, storage of the applications into one or more database objects and executing of the applications in a virtual machine in process space 449 of MTS 440.

In one embodiment, MTS 440 is configured to provide webpages, forms, applications, data and media content to user client) device to support the access by user devices as tenants of MTS 440. In one embodiment, MTS 440 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

Figure 5:
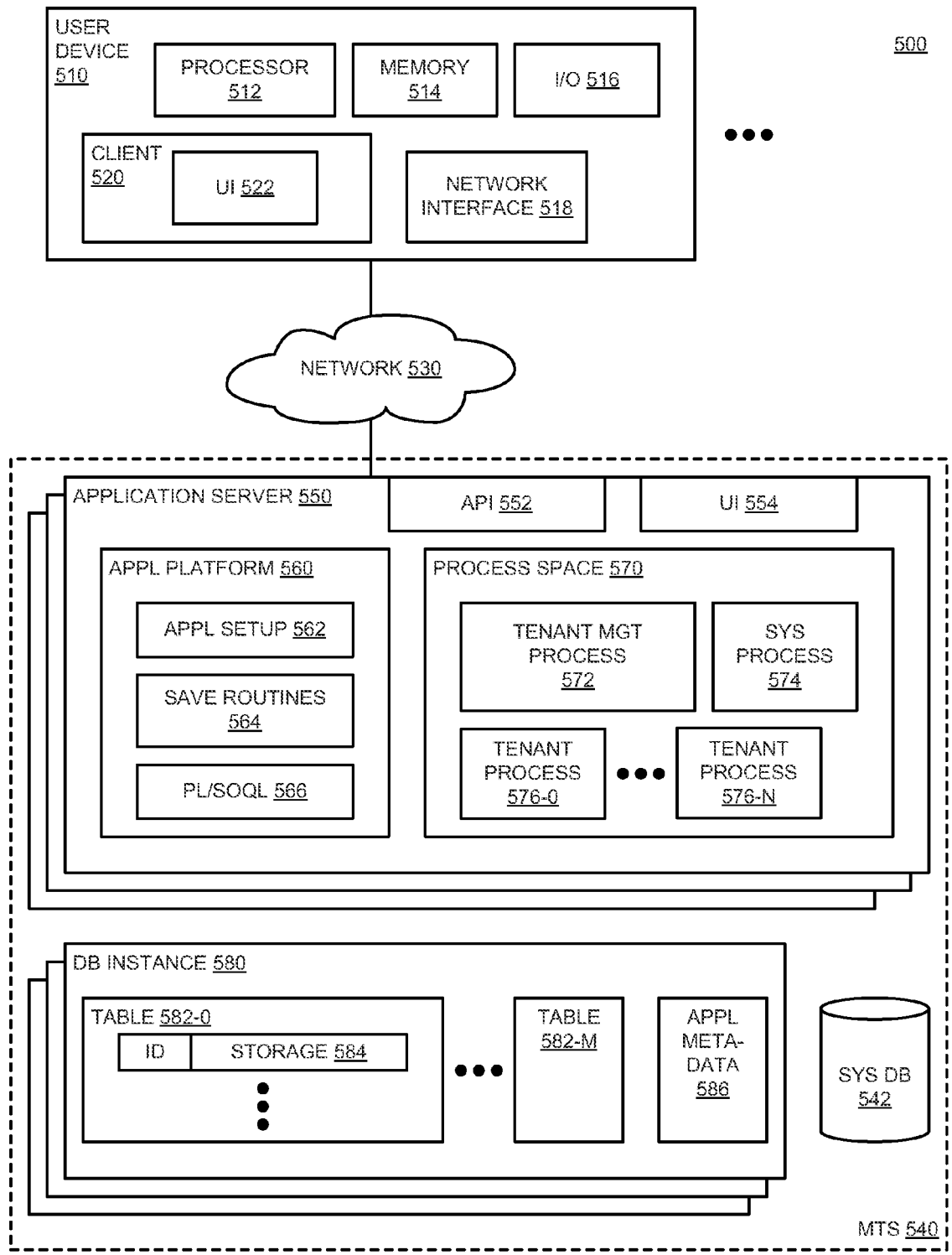
FIG. 5 is a block diagram of an embodiment of an environment for on-demand database services with a multitenant database having multiple data tables.

FIG. 5 is a block diagram of an embodiment of an environment for on-demand database services with a multitenant database having multiple data tables. Environment 500 includes components related to providing an on-demand database service, and may be one example of environment 400 of FIG. 4, with additional components shown. Environment 500 includes one or more multitenant database systems (MTS) 540 and one or more tenants of the MTS, as illustrated by user device 510. User device 510 is generally part of an organization that is the tenant, and user device 510 provides a computing device through which access to MTS 540 is available. MTS 540 provides on-demand database services for environment 500.

Environment 500 may include conventional, well-known elements that are explained only briefly here. For example, user device 510 (and any other user devices through which users access MTS 540) could include a desktop personal computer, workstation, laptop, handheld device, cell phone or smart phone, or any wireless access protocol (WAP) enabled device or any other computing device capable of interfacing directly or indirectly to the Internet or other network connection.

User device 510 includes processor 512, which represents one or more processor devices, and may be any combination of one or more processors. Processor 512 provides hardware means to execute programs and applications on user device 510. Memory 514 represents a memory system for user device 510, and may be any combination of one or more memory devices, short term, and/or tong term memory. I/O (input/output) 516 represents any type of input and output devices such as keyboards, pointers and controllers, touchscreens, buttons, microphones, or other input mechanisms, and monitors, screens, printers, interfaces to networks, and/or other output devices.

User device 510 includes network interface 518, which represents hardware interconnections and control logic and circuitry to enable user device 510 to connect to network 530. Network interface 518 also has associated drivers and possibly other software components to allow user programs to interface with the interconnection hardware. User device 510 includes client 520, which represents a program that allows a user of user device 510 to access information from network 530, such as accessing MTS 540. UI 522 represents a user interface component of client 520, or a user interface in which information from client 520 is presented on user device 520. Thus, UI 522 may be integrated with client 520, or it may be separate from client 520, but display data related to the execution of client 520. UI 522 is rendered on display or user interface hardware or device, which can be understood to be represented by UI 522.

In one embodiment, user device 510 runs an HTTP client as client 520. An HTTP client may be, for example, a browsing program or a browser, which may include a WAP-enabled browser in the case of a cell phone, PDA or other wireless device. The HTTP client allows a user (e.g., subscriber of MTS 540) of user device 510 to access, process, and view information, pages, and applications available from MTS 540 over network 530, based on permissions and privileges. The user interface device of user device 510 can be used to access data and applications hosted by MTS 540, and to perform searches on stored data, and otherwise allow a user to interact with various GUI (graphical user interface) pages that may be presented to a user.

Similar to what is discussed above with reference to network 430 of environment 400, network 530 represents any network or group of networks over which access can be provided to MTS 540. Network 530 may include switching and/or routing elements, cables, connectors, and other components. In one embodiment, at least part of network 530 is the Internet, referring to a specific global internetwork of networks. However, it should be understood that other networks can be used in addition to or instead of the Internet, such as an intranet, an extranet, virtual private network (VPN), a non-TCP/IP based network, any LAN or WAN or other network.

In one embodiment, user devices such as user device 510 (which may be client systems) communicate with application server 550 to request and update system-level and tenant-level data from MTS 540 that may require sending one or more queries to tenant data storage in database instance 580 and/or system data in system database 542. In one embodiment, MTS 540 (e.g., application server 550) automatically generates one or more SQL statements (e.g., one or more SQL queries) designed to access the desired information. System data storage in system database 542 may generate query plans to access the requested data from database instance 580.

In one embodiment, MTS 540 includes one or more application servers 550. From one perspective, application server 550 can be considered a network interface of MTS 540 to connect to network 530. Application server 550 exchanges (i.e., receives and/or transmits) data with network 530, such as receiving requests and sending replies or sending data. Application servers 550 may share hardware resources for interfacing with network 530, or they may be assigned separate resources. In one embodiment, one or more of application servers 550 can be implemented as an HTTP application server.

In one embodiment, each application server 550 is configured to handle requests for any user associated with any organization that is a tenant. Thus, a request from user device 510 could be received and processed at any application server 550. There may be advantages to avoiding affinity for a user and/or an organization or tenant to a specific application server 550, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing aloud balancing function (e.g., an F5 Big-IP load balancer) is communicably coupled between application servers 550 and the user devices to distribute requests to the application servers 550. In one embodiment, the load balancer uses a least connections algorithm to route user requests to the application servers 550. Other examples of load balancing algorithms, such as round robin and observed response time, also can be used. For example, in certain embodiments, three consecutive requests from the same user could hit three different application servers 550, and three requests from different users could hit the same application server 550. In this manner, MTS 540 is multitenant, wherein MTS 540 handles storage of, and access to, different objects, data, and applications across disparate users and organizations. In one embodiment, Each application server 550 includes elements to provide database access service and request processing. Application server 550 includes API (application programming interface) 552 and UI 554. UI 554 represents server-side components that provide user interface elements that are provided to user device 510 for display. API 552 provides an interface for users and/or developers to access resident processes of MTS 540.

In one embodiment, application server 550 includes application (appl) platform 560, which provides a sub-environment on which applications hosted by application server 550 can be executed. Application platform 560 may include an operating system or other control logic, as well as business logic and common routines for use by the applications. As illustrated, application platform 560 includes application setup mechanism 562 that supports creation and management of applications, including configuration, by application developers, which may be saved as metadata into tenant data storage of database (db) instance 580. Save routines 564 represent the mechanisms used to store data in database instance 580, such as storing the application setup metadata. Such applications can be executed by subscriber users, for example, in process space 570.

In one embodiment, invocations to or related to such applications may be coded using PL/SOQL (Procedural Language Salesforce Object Query Language) that provides a programming language style interface extension to API 552. Thus, PL/SOQL 566 is capable of serving as a procedural extension to an on-demand database centric service API that allows flow control and transaction control to execute on a server in conjunction with database APIs (e.g., SOQL, data manipulation language (DML), or others). PL/SOQL 566 can enable the capability to thread together multiple SOQL/DML statements as a single unit of work on the server. PL/SOQL 566 need not necessarily be considered a general purpose programming language, seeing that it may be implemented as heavily data focused, but is not necessarily implemented that way. In one embodiment, PL/SOQL 566 can be used by developers to interlace with an on-demand database system, in contrast to traditional application developers' conventional tools, such as PL/SQL (Structured Query Language) of ORACLE, Inc. of Redwood Shores, Calif., and others.

in one embodiment, PL/SOQL 566 includes variable and expression syntax, block and conditional syntax, loop syntax, object and array notation, pass by reference, and other syntax known to other programming languages. Thus, hill control over syntax and the ability to reference dynamic schema elements is provided with anew language and runtime for database services. Where embedded concepts that interface with on-demand database applications are provided, syntax and semantics that are easy to understand and which encourage efficient use of database APIs may also be employed. In one embodiment, PL/SOQL 566 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, now expired, which is incorporated in its entirety.

In one embodiment, invocations to applications may be detected by one or more system processes, which manage retrieving application metadata 586 for the subscriber making the invocation and executing the metadata as an application in a virtual machine. Metadata 586 provides data related to access and/or use of data stored in database instance 580. In one embodiment, metadata is stored in a separate table within database instance 580, and in an alternative embodiment, metadata 586 is stored with other data elements of user storage (such as with user storage 584 of table 582-0.

In one embodiment, application server 550 includes process space 570, which may include tenant process spaces 576-0 through 576-N (for some integer number N of process spaces configured in application server 550), tenant management process space 572 and system process space 574. It will be understood that process space 570 is an abstraction to illustrate the resources allocated for execution of processes (e.g., programs or applications) within application server 550. The skilled reader recognizes that memory and processor and other hardware resources may need to be allocated, as well as software resources to support the execution of a process. The processes may be executed as separate threads, or my share a thread. In one embodiment, the number N of tenant processes is equal to a number of subscriber tenants. In another embodiment, the number N of tenant processes may be higher than the number of subscriber tenants. Tenant management process 572 provides management of the other processes, including determining when certain processes execute. System process 574 executes operations related to functions of MTS 540.

Each application server 550 may be configured to tenant data storage in database instance 580 and the tenant data stored therein, and to system data storage of system database 542 and the system data stored therein to serve requests of user devices. As mentioned above, in one embodiment, tenant data is separated logically, and stored in the same multitenant database. In one embodiment, database instance 580 stores data in tables 582-0 through 582-M, where M is some integer number of tables. In one embodiment, different tables store data of different types. Application metadata 586 may be implemented as a separate table. Alternatively, one of the tables 582-0 through 582-M could be a table that stores varying types of objects, which are defined through metadata stored in the table.

In one embodiment, database instance is further implemented with user storage space distinct identifiable) from its associated tenant. Thus, for example, user data may include the tenant ID, as well as an identifier specific to a user. Thus, storage 584 may represent either or both of tenant storage or user storage. For example, a copy of a user's most recently used (MRU) items might be stored to in user storage within database instance 580. Similarly, a copy of MRU items for an entire organization that is a tenant might be stored to a tenant storage area of database instance 580. In one embodiment, the tenant data and the system data (as illustrated by system database 542) are stored in separate databases.

Application servers 550 may be communicably coupled to database systems, e.g., having access to system database 542 and tenant database instance 580, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 580, one tenant might be a company that employs a sales force where each salesperson uses MTS 540 to manage their sales process. Thus, a user might maintain contact data, leads data, customer follow-up data, performance data, goals and progress data, and other data, all applicable to that user's personal sales process e.g., storage 584, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 540 that are allocated at the tenant level while other data structures might be managed at the user level. Because MTS 540 may support multiple tenants including possible competitors, MTS 540 should have security protocols that keep data, applications, and application use separate. Additionally, because many tenants may opt for access to an MTS rather than maintain their own system, redundancy, up-time, and backup are additional functions that may be implemented in MTS 540. In addition to user-specific data and tenant specific data, MTS 540 may also maintain system level data usable by multiple tenants or other data. Such system level data might include industry reports, news, postings, and the like that are sharable among tenants.

In one embodiment, each database instance 580 can be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 582-0 through 582-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

Figure 6:
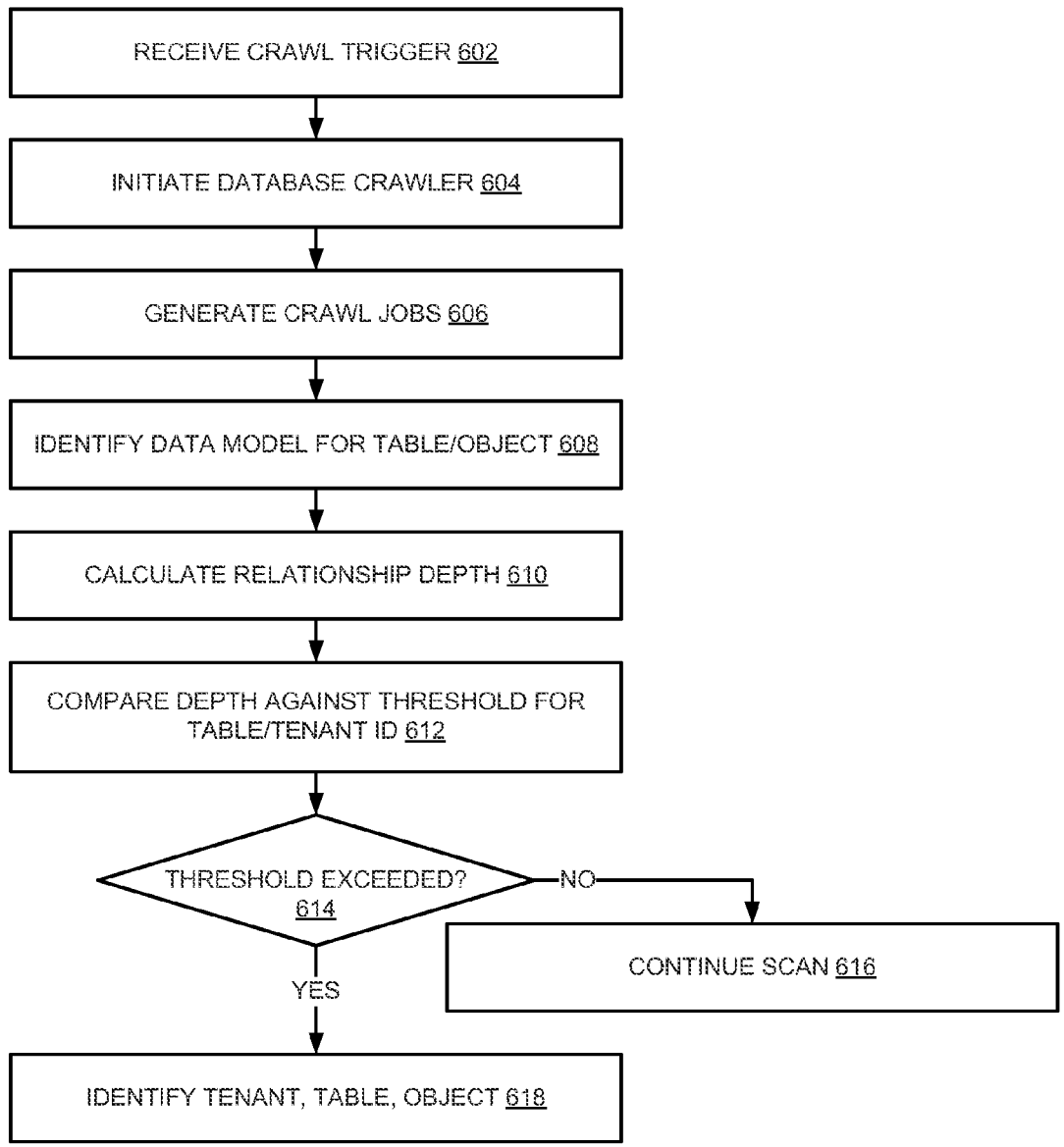
FIG. 6 represents a flow diagram of an embodiment of detecting skew in an on-demand database services environment.

FIG. 6 represents a flow diagram of an embodiment of detecting skew in an on-demand database services environment. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

A skew agent receives a crawl trigger, 602. The crawl trigger can be initiated by an automated process (e.g., a tinier or a calendared event), or the trigger can be initiated in response to a human interaction (e.g., an administrator requesting a crawl). The skew agent initiates a database crawler to perform the crawl, 604. In one embodiment, the skew agent includes a scheduler or scheduling process to generate crawl jobs, 606. The crawl jobs are sent to execution resources such as one or more application servers and associated hardware for execution.

The crawler then continues its operation to perform the crawl jobs. In one embodiment, the crawler identifies a data model for a table and/or for an object of a multitenant database, 608. For standard objects, data model information may be available from system data. For custom objects, the crawler may read metadata describing the data model of an object to inspect for skew. The crawler calculates relationship depth based on the information about the data model, 610.

The crawler compares the calculated relationship depth against a threshold value for the tenant ID, and possibly for the combination of tenant ID and table, 612. In one embodiment, relationship depth is calculated per tenant and table the threshold relationship depth is not exceeded by the calculated relationship depth, 614, the crawler continues its scan, 616.

If the threshold relationship depth is exceeded by the calculated relationship depth, 614, the crawler identifies the tenant (and possibly table and/or object) associated with the skew, 618. In one embodiment, the crawler identifies the tenant and object as being skewed. The skew agent could then specifically identify the skewed data or skewed relationship directly to a user for correction.

Figure 7:
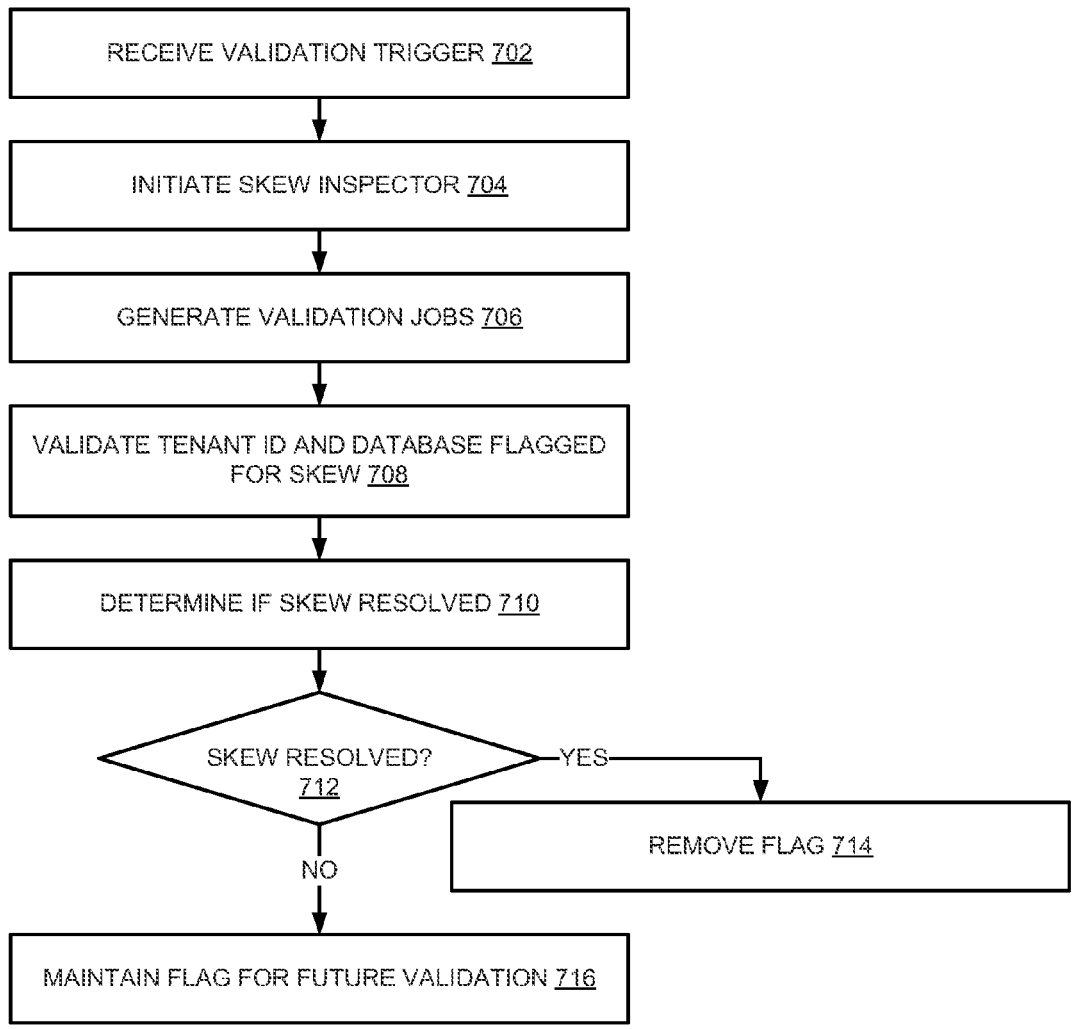
FIG. 7 represents a flow diagram of an embodiment of determining if skew is resolved in anon-demand database services environment.

FIG. 7 represents a flow diagram of an embodiment of determining if skew is resolved in an on-demand database services environment. While the flow of FIG. 6 discusses operations associated with the execution of the crawler, the flow of FIG. 7 discusses the operations associated with the execution of a skew verification tool (such as inspector 350 of FIG. 3).

The skew agent receives a validation trigger, 702. The validation trigger can be initiated by an automated process (e.g., a timer or a calendared event), or the trigger can be initiated in response to a human interaction (e.g., an administrator requesting a verification of skew). The skew agent initiates a skew inspector to perform the verification, 704. In one embodiment, the skew agent includes a scheduler or scheduling process to generate validation jobs, 706. The validation jobs are sent to execution resources such as one or more application servers and associated hardware for execution.

The inspector then continues its operation to perform the jobs related to verification of identified skew. In one embodiment, the inspector validates a tenant ID and database and potentially object flagged for skew, 708. Similar to the crawler discussed above, the inspector can access data model information to determine how to calculate skew for a particular object or table. The inspector calculates relationship depth based on the information about the data model to determine if the skew has been resolved, 710.

If the skew is resolved, 712, the inspector removes a skew flag associated with the data, 714. If the skew is not resolved, 712, the inspector maintains the flag for future validation operations, 716. In one embodiment, skew that has not been resolved is placed on a schedule for validation. Thus, the skew may be checked periodically to determine if skew is resolved. In one embodiment, the inspector or the skew agent can apply further restrictions to data for which skew has not been resolved.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method performed by a computing system comprising:

receiving a request to detect data skew in a multitenant database, where data skew indicates a relationship depth for data elements of the multitenant database greater than a threshold for a particular client organization; wherein the multitenant database stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization;

initiating a database crawler to detect data skew of data stored in the multitenant database; calculating relationship depth of objects within the multitenant database, including identifying relationships by tenant ID; and identifying data skew where relationship depth for objects associated with a particular tenant ID exceeds the threshold.

2. The method of claim 1, wherein the multitenant database is relational, and data skew indicates a relationship depth for data elements of the multitenant database greater than a threshold for a particular client organization for a particular database table; wherein calculating relationship depth includes identifying relationships by tenant ID and database table;

and wherein identifying data skew includes identifying objects associated with a particular tenant ID that exceeds a threshold for a particular database table.

3. The method of claim 1, wherein receiving the request to detect data skew comprises: receiving a request triggered by an indication to crawl the multitenant database for data skew.

4. The method of claim 3, wherein receiving the request triggered by the indication comprises: receiving a request triggered by a crawl scheduler based on timing.

5. The method of claim 3, wherein receiving the request triggered by the indication comprises: receiving a request triggered by a crawl scheduler based on a determined state of a multitenant database system of which the multitenant database is a part.

6. The method of claim 1, wherein receiving the request to detect data skew comprises: identifying a slow running query; and automatically triggering a crawl based on identification of the slow running query.

7. The method of claim 1, wherein calculating the relationship depth of objects further comprises: identifying a data model associated with the object.

8. The method of claim 7, further comprising, for an object identified as having a data model different than a standard data model: accessing a metadata table that identifies the different data model of the object; and calculating relationship depth by counting relationships to other objects based on the different data model.

9. An article of manufacture comprising a non-transitory computer readable storage medium having content stored thereon, which when executed, cause a machine to perform operations including:

receiving a request to detect data skew in a multitenant database, where data skew indicates a relationship depth for data elements of the multitenant database greater than a threshold for a particular client organization; wherein the multitenant database stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization;

initiating a database crawler to detect data skew of data stored in the multitenant database;

calculating relationship depth of objects within the multitenant database, including identifying relationships by tenant ID; and identifying data skew where relationship depth for objects associated with a particular tenant ID exceeds the threshold.

10. The article of manufacture of claim 9, wherein the multitenant database is relational, and data skew indicates a relationship depth for data elements of the multitenant database greater than a threshold for a particular client organization for a particular database table; wherein the content to provide instructions for calculating relationship depth comprises content to provide instructions for identifying relationships by tenant ID and database table; and wherein the content to provide instructions for identifying data skew comprises content to provide instructions for identifying objects associated with a particular tenant ID that exceeds a threshold for a particular database table.

11. The article of manufacture of claim 9, wherein the content to provide instructions for receiving the request to detect data skew comprises content to provide instructions for receiving a request triggered one of a request triggered by a crawl scheduler based on timing, a request triggered by a crawl scheduler based on a determined state of a multitenant database system of which the multitenant database is a part, or a request generated by an administrator.

12. The article of manufacture of claim 9, wherein the content to provide instructions for receiving the request to detect data skew comprises content to provide instructions for identifying a slow running query; and automatically triggering a crawl based on identification of the slow running query.

13. The article of manufacture of claim 9, wherein the content to provide instructions for calculating the relationship depth of objects further comprises content to provide instructions for identifying a data model associated with the object.

14. The article of manufacture of claim 13, further comprising, for an object identified as having a data model different than a standard data model, content to provide instructions for accessing a metadata table that identifies the different data model of the object; and calculating relationship depth by counting relationships to other objects based on the different data model.

15. A computer-based system comprising:

a processor; and memory storing computer code components executed by the processor, the computer code components comprising:

a multitenant database including hardware and software components to implement a database shared by a plurality of separate and distinct customer organizations;

wherein the multitenant database stores data for multiple client organizations each identified by a tenant identifier (ID) and one or more users are associated with the tenant ID, wherein the one or more users of each client organization accesses data identified by the tenant ID associated with the respective client organization, and wherein the multitenant database is hosted by an entity separate from the client organization;

a scheduler to receive a request to detect data skew in the multitenant database, wherein data skew indicates a relationship depth for data elements of the multitenant database greater than a threshold for a particular client organization, and initiate a database crawler to detect data skew of data stored in the multitenant database; and a database crawler to calculate relationship depth of objects within the multitenant database, including identify relationships by tenant ID, and identify data skew where relationship depth for objects associated with a particular tenant ID exceeds the threshold.

16. The system of claim 15, wherein the multitenant database is relational, and data skew indicates a relationship depth for data elements of the multitenant database greater than a threshold for a particular client organization for a particular database table; wherein the database crawler is to calculate relationship depth including identifying relationships by tenant ID and database table; and wherein the database crawler is to identify data skew including identifying objects associated with a particular tenant ID that exceeds a threshold for a particular database table.

17. The system of claim 15, wherein the scheduler is to receive the request to detect data skew including receiving a request triggered one of a request triggered by a crawl scheduler based on timing, a request triggered by a crawl scheduler based on a determined state of a multitenant database system of which the multitenant database is a part, or a request generated by an administrator.

18. The system of claim 15, wherein the scheduler is to receive the request to detect data skew including identifying a slow running query, and automatically triggering a crawl based on identification of the slow running query.

19. The system of claim 15, wherein the database crawler is to calculate the relationship depth of objects including accessing a metadata table that identifies a data model of an object, and calculating relationship depth by counting relationships to other objects based on the data model.

20. The system of claim 15, further comprising: a skew verification agent to re-calculate relationship depth of objects identified by the database crawler as having data skew, and remove a skew flag for an object where data skew has been resolved.

* * * * *